US008153001B2

(12) United States Patent
Peters

(10) Patent No.: US 8,153,001 B2
(45) Date of Patent: Apr. 10, 2012

(54) LIQUID VACUUMING AND FILTERING DEVICE AND METHOD

(75) Inventor: Bryan Peters, Hamilton, OH (US)

(73) Assignee: Exair Corporation, Cincinnati, OH (US)

( * ) Notice: Subject to any disclaimer, the term of this patent is extended or adjusted under 35 U.S.C. 154(b) by 407 days.

(21) Appl. No.: 12/560,086

(22) Filed: Sep. 15, 2009

(65) Prior Publication Data

US 2011/0062091 A1 Mar. 17, 2011

(51) Int. Cl.
*B01D 29/27* (2006.01)
*B01D 29/88* (2006.01)

(52) U.S. Cl. ........ 210/232; 210/239; 210/248; 210/406; 210/416.1; 210/419; 210/420; 210/424

(58) Field of Classification Search .................. None
See application file for complete search history.

(56) References Cited

U.S. PATENT DOCUMENTS

| 946,535 | A | * | 1/1910 | Craver ........................... 96/416 |
| 1,986,476 | A | | 1/1935 | Ironside |
| 2,913,120 | A | * | 11/1959 | Glasby, Jr. et al. ........ 210/416.1 |
| 3,180,071 | A | | 4/1965 | Nolte |
| 3,343,199 | A | | 9/1967 | Nolte |
| 3,355,026 | A | * | 11/1967 | Schut ......................... 210/416.5 |
| 3,473,662 | A | * | 10/1969 | Kudlaty ......................... 210/100 |
| 3,774,613 | A | * | 11/1973 | Woods et al. ................. 604/128 |
| 4,061,573 | A | * | 12/1977 | Biron ........................... 210/282 |
| 4,128,478 | A | * | 12/1978 | Metzger .................. 210/167.01 |
| 4,158,575 | A | * | 6/1979 | Townsend ......................... 134/6 |
| 4,168,563 | A | * | 9/1979 | O'Bryan ......................... 15/321 |
| 4,402,687 | A | * | 9/1983 | Denty et al. ................... 604/319 |
| 4,467,494 | A | * | 8/1984 | Jones ............................. 15/353 |
| 4,509,963 | A | | 4/1985 | Jackson |
| 4,610,785 | A | | 9/1986 | Russell |
| 4,610,786 | A | | 9/1986 | Pearson |
| 4,745,655 | A | * | 5/1988 | Johnson ......................... 15/409 |
| 4,801,376 | A | * | 1/1989 | Kulitz ........................... 210/123 |
| 4,834,836 | A | * | 5/1989 | Wemhoff ......................... 159/23 |

(Continued)

OTHER PUBLICATIONS

Product information for "Reversible Drum Vac," by EXAIR, http://www.exair.com/en-US/Primary%20Navigation/Products/Industrial%20Housekeeping/Drum%20Vacs/Pages/Drum%20Vac20%20Home.aspx (1994).

*Primary Examiner* — Robert James Popovics
(74) *Attorney, Agent, or Firm* — Thompson Hine LLP

(57) ABSTRACT

A liquid vacuuming and filtering device may include a container having an interior sealed from the ambient, a vacuum pump in communication with the interior, a two-way valve connected to the container interior, a flexible hose connected to the valve, a filter positioned within the container interior and connected to the valve and a standpipe positioned within the interior and connected to the valve. The vacuum pump may be adjusted to a filling configuration in which the pump evacuates the container interior to a pressure below ambient, which causes fluid to be drawn through the hose, valve and through the filter, which may collect particulates that contaminate the fluid. Filtered fluid then collects within the container. The vacuum pump also may be adjustable to a discharge configuration in which the pump pressurizes the interior to a pressure above ambient, wherein the valve is adjusted to allow filtered fluid within the container to flow through the standpipe, valve and be discharged from the container through the hose. The device may be suitable for reclaiming contaminated fluid used in machining operations, oil or coolant reservoirs, cooking oil and the like.

12 Claims, 4 Drawing Sheets

U.S. PATENT DOCUMENTS

| | | | |
|---|---|---|---|
| 4,836,937 A * | 6/1989 | Homer | 210/808 |
| 4,865,724 A | 9/1989 | Brandt et al. | |
| 4,868,949 A * | 9/1989 | Loveless et al. | 15/352 |
| 4,870,975 A * | 10/1989 | Cronk et al. | 600/562 |
| 4,950,392 A * | 8/1990 | Tiegs et al. | 210/167.01 |
| 4,954,267 A * | 9/1990 | Uremovich | 210/771 |
| 4,957,492 A * | 9/1990 | McVay | 604/319 |
| 4,976,850 A * | 12/1990 | Kulitz | 210/104 |
| 4,983,282 A * | 1/1991 | Roy et al. | 210/95 |
| 4,986,912 A * | 1/1991 | Fisch | 210/448 |
| 4,991,608 A * | 2/1991 | Schweiger | 134/56 R |
| 4,994,184 A * | 2/1991 | Thalmann et al. | 210/251 |
| 5,022,995 A * | 6/1991 | Roy et al. | 210/651 |
| 5,035,811 A * | 7/1991 | Grondin et al. | 210/806 |
| 5,047,089 A * | 9/1991 | Grant | 134/21 |
| 5,073,258 A * | 12/1991 | Boullain et al. | 210/172.1 |
| 5,075,002 A * | 12/1991 | Thalmann et al. | 210/251 |
| 5,091,085 A * | 2/1992 | Thalmann et al. | 210/321.65 |
| 5,091,095 A * | 2/1992 | Fries et al. | 210/742 |
| 5,100,540 A * | 3/1992 | Ramirez et al. | 210/86 |
| 5,104,529 A * | 4/1992 | Becker | 210/195.1 |
| 5,108,591 A * | 4/1992 | Hagan | 210/104 |
| 5,114,574 A * | 5/1992 | Barry | 210/137 |
| 5,137,368 A * | 8/1992 | Kistner | 366/272 |
| 5,142,730 A | 9/1992 | Braks et al. | |
| 5,143,615 A * | 9/1992 | Roy et al. | 210/350 |
| 5,158,677 A | 10/1992 | Hewitt et al. | |
| 5,176,837 A * | 1/1993 | Dietrick | 210/767 |
| 5,196,123 A * | 3/1993 | Guthy | 210/663 |
| 5,220,933 A * | 6/1993 | Albers | 134/58 R |
| 5,227,060 A * | 7/1993 | Roy et al. | 210/258 |
| 5,230,793 A | 7/1993 | Lenhart et al. | |
| 5,231,805 A * | 8/1993 | Sander | 451/88 |
| 5,263,225 A | 11/1993 | Winters | |
| 5,395,514 A * | 3/1995 | Siegler | 210/85 |
| 5,417,849 A | 5/1995 | McEwen et al. | |
| 5,417,851 A * | 5/1995 | Yee | 210/167.01 |
| 5,464,033 A * | 11/1995 | Hartnell | 134/105 |
| 5,482,061 A * | 1/1996 | Bell | 134/56 R |
| 5,599,457 A | 2/1997 | Fanning et al. | |
| 5,702,607 A * | 12/1997 | Lawson | 210/663 |
| 5,720,874 A * | 2/1998 | Siegler | 210/85 |
| 5,772,402 A | 6/1998 | Goodman | |
| 5,800,104 A | 9/1998 | Miyano | |
| 5,948,274 A | 9/1999 | Lyon et al. | |
| 6,112,366 A * | 9/2000 | Berfield | 15/352 |
| 6,125,883 A | 10/2000 | Creps et al. | |
| 6,126,822 A | 10/2000 | Ostermeier et al. | |
| 6,170,118 B1 * | 1/2001 | McIntyre et al. | 15/327.6 |
| 6,207,051 B1 * | 3/2001 | Anderson et al. | 210/237 |
| 6,322,694 B1 * | 11/2001 | Iliadis et al. | 210/167.01 |
| 6,358,409 B1 * | 3/2002 | Jacoby et al. | 210/122 |
| 6,425,715 B1 | 7/2002 | Sasanecki | |
| 6,471,751 B1 * | 10/2002 | Semanderes et al. | 95/271 |
| 6,565,758 B1 | 5/2003 | Thomas | |
| 6,569,217 B1 * | 5/2003 | DeMarco | 55/324 |
| 6,666,286 B2 * | 12/2003 | Yamashita | 175/209 |
| 6,685,758 B1 * | 2/2004 | Bennett et al. | 55/385.1 |
| 6,911,145 B2 * | 6/2005 | Hutchinson et al. | 210/258 |
| 6,936,085 B2 * | 8/2005 | DeMarco | 55/324 |
| 6,962,656 B2 | 11/2005 | Davidian et al. | |
| 6,969,414 B2 * | 11/2005 | Fisher | 55/350.1 |
| 7,033,513 B2 * | 4/2006 | Riggins et al. | 210/805 |
| 7,045,068 B2 * | 5/2006 | Hutchinson et al. | 210/808 |
| 7,203,994 B2 | 4/2007 | Smith | |
| 7,214,314 B2 * | 5/2007 | Reyniers | 210/232 |
| 7,223,337 B1 * | 5/2007 | Franzino et al. | 210/241 |
| 7,258,784 B2 | 8/2007 | O'Ryan et al. | |
| 7,282,156 B2 * | 10/2007 | Franzino et al. | 210/767 |
| 7,299,522 B1 | 11/2007 | Smith | |
| 7,341,659 B2 * | 3/2008 | Streicher et al. | 210/167.01 |
| 7,368,054 B2 * | 5/2008 | Porter et al. | 210/143 |
| 7,378,026 B1 * | 5/2008 | Thompson | 210/767 |
| 7,407,474 B2 | 8/2008 | Smith | |
| D577,415 S * | 9/2008 | Reid | D23/209 |
| 7,438,820 B1 * | 10/2008 | Sanchez | 210/767 |
| 7,459,074 B1 * | 12/2008 | Sanchez | 210/94 |
| 7,537,691 B2 * | 5/2009 | Reid | 210/167.12 |
| 7,676,965 B1 * | 3/2010 | Nathenson et al. | 37/317 |
| D632,709 S * | 2/2011 | Schade | D15/122 |
| 2003/0131571 A1 | 7/2003 | Demarco | 55/324 |
| 2004/0011749 A1 * | 1/2004 | Hutchinson et al. | 210/808 |
| 2004/0164033 A1 * | 8/2004 | Reyniers | 210/800 |
| 2004/0232061 A1 * | 11/2004 | Dillon | 210/257.2 |
| 2005/0205497 A1 * | 9/2005 | Hutchinson et al. | 210/767 |
| 2006/0032801 A1 * | 2/2006 | Reid | 210/169 |
| 2006/0226058 A1 * | 10/2006 | Porter et al. | 210/143 |
| 2007/0007192 A1 * | 1/2007 | Reid | 210/269 |
| 2007/0075005 A1 * | 4/2007 | Haworth | 210/172.1 |
| 2010/0133206 A1 * | 6/2010 | Schade | 210/805 |
| 2011/0062091 A1 * | 3/2011 | Peters | 210/808 |
| 2011/0296646 A1 * | 12/2011 | Showley | 15/327.1 |

* cited by examiner

LIQUID VACUUMING AND FILTERING DEVICE AND METHOD

BACKGROUND

This disclosure is directed to vacuuming devices and, more particularly, to vacuuming devices that collect and filter contaminated fluid and the filtered fluid is subsequently discharged.

Vacuuming devices have been developed in a variety of designs, each to accomplish a specific task or set of tasks. One common configuration of a vacuuming device is a portable vacuum in which a canister, which may be a drum or other enclosed vessel, is used to collect material that is to be vacuumed. A flexible hose that terminates in a rigid wand or other tool is connected to the canister and the wand is placed in or near the material to be collected. Such devices typically include a vacuum pump that lowers the pressure within the sealed canister to below ambient, and the pressure differential causes material to be sucked through the collection hose and collected within the interior of the canister. Such portable devices may be used to vacuum and collect dry particulate material, fluids or a combination of fluids and particulate material.

Certain types of vacuuming devices may be adjusted to a vacuuming configuration, in which particulate material, a fluid or a combination thereof, is drawn through the collection hose and is retained within the canister, or to a discharge configuration, in which operation of the vacuum pump is reversed to pressurize the interior of the canister above ambient pressure. The pressurized interior forces the collected material, typically a fluid, out through the collection hose, or in some embodiments out through a second hose, thereby emptying the contents of the canister.

A common application for such vacuuming devices with reversible vacuum pumps is the collection and filtering of fluid that contains or is contaminated with particulate material. With such devices, the collection hose is first connected to a port that communicates with a collection filter within the canister. In the vacuuming or collecting mode, fluid with particulate material suspended in it is drawn through the collection hose and through the filter in the canister, which collects the particulate material suspended in the fluid. The filtered fluid is also retained within the canister. In a discharge mode, the collection hose is disconnected from a collection port, that port is closed off and the hose is connected to a second port that communicates with the interior of the canister and bypasses the filter. The vacuum pump is then adjusted to pressurize the interior of the canister. The filtered, collected fluid in the canister is then discharged through the hose.

There is a need for a liquid vacuuming and filtering device that is simple to operate and eliminates the need to adjust hoses when switching from a collection mode to a discharge mode.

SUMMARY

This disclosure is directed to a liquid vacuuming and filtering device and method. The device may be adjustable to a liquid collecting mode and to a liquid discharge mode without having to disconnect and reconnect the fluid collection hose. Moreover, the disclosed liquid vacuuming and filtering device may use the same, single hose both for collecting contaminated fluid and for discharging filtered fluid. Multiple hoses or discharge ports may not be needed.

In one aspect, the disclosed liquid vacuuming and filtering device may include a sealed container, a reversible vacuum pump communicating with an interior of the container, a two-way valve mounted on the container, a flexible hose connected to the valve, a filter positioned within the container and connected to the valve and a standpipe connected to the valve and extending within the container. In one aspect, the vacuum pump may be a reversible pneumatic pump. When the reversible pneumatic pump and the valve are adjusted to a filling configuration, and the flexible hose is placed at or in a fluid containing particulate material, the pump evacuates air from within the container to create a below-ambient pressure within the container. This partial vacuum may cause fluid to be drawn through the flexible hose, through the valve and into the filter within the container interior. The container interior fills with fluid and the filter may trap and collect the particulate material that was suspended in the fluid or was taken in through the hose along with the fluid.

The disclosed reversible vacuum pump and valve may be adjusted to a discharge configuration in which the reversible vacuum pump pressurizes the container interior to a pressure above ambient. In this configuration, the valve may be adjusted to create a fluid flow channel through the standpipe in the interior of the container, through the valve and out the flexible hose. The above-ambient pressure within the container may cause fluid within the container to flow through this channel and be discharged through the hose.

In this fashion, the disclosed liquid vacuuming and filtering device may be used to recondition cutting fluid or machine coolant that has become contaminated with particulate material such as dirt, metal particles and shavings. Operation of the device may draw such contaminated fluid from a sump through the flexible hose, valve and through the filter so that the particulate material may be collected within the filter and the filtered fluid fills the container. The device then may be adjusted to a discharge configuration and the filtered fluid returned to the sump through the flexible hose.

It is within the scope of the disclosure to utilize such a device in a number of other applications. For example, the device may be used to filter and recondition contaminated fluid from any sort of power transmission gear enclosure, such as an automobile transmission or differential, to filter and recondition contaminated fluid from equipment with oil or coolant reservoirs, to filter and recondition cooking oil, to clean ponds, to filter fluid taken from flooded vaults, and to collect and filter fluid from other waste containers.

It is also within the scope of this disclosure to utilize the disclosed device to clean up spills. In such applications, the hose may include a tool, such as a floor attachment, attached to its distil end that would facilitate vacuuming spilled fluid from, for example, a shop floor. The fluid may then be collected within the device and any particulate material filtered from the fluid. Disposal of the fluid and the particulate material thus would be facilitated.

In one aspect, the device may utilize a polyester bag filter that is removable and replaceable. Such a filter may be used with varying pore sizes, from 5 to 50 microns and larger, and down to 1 micron or less for applications to reclaim precious metals. It is also within the scope of the disclosure to utilize mesh filters made of other materials, such as metal.

Other objects and advantages of the disclosed device will be apparent from the following description, the accompanying drawings and the appended claims.

DETAILED DESCRIPTION

Figure 1:
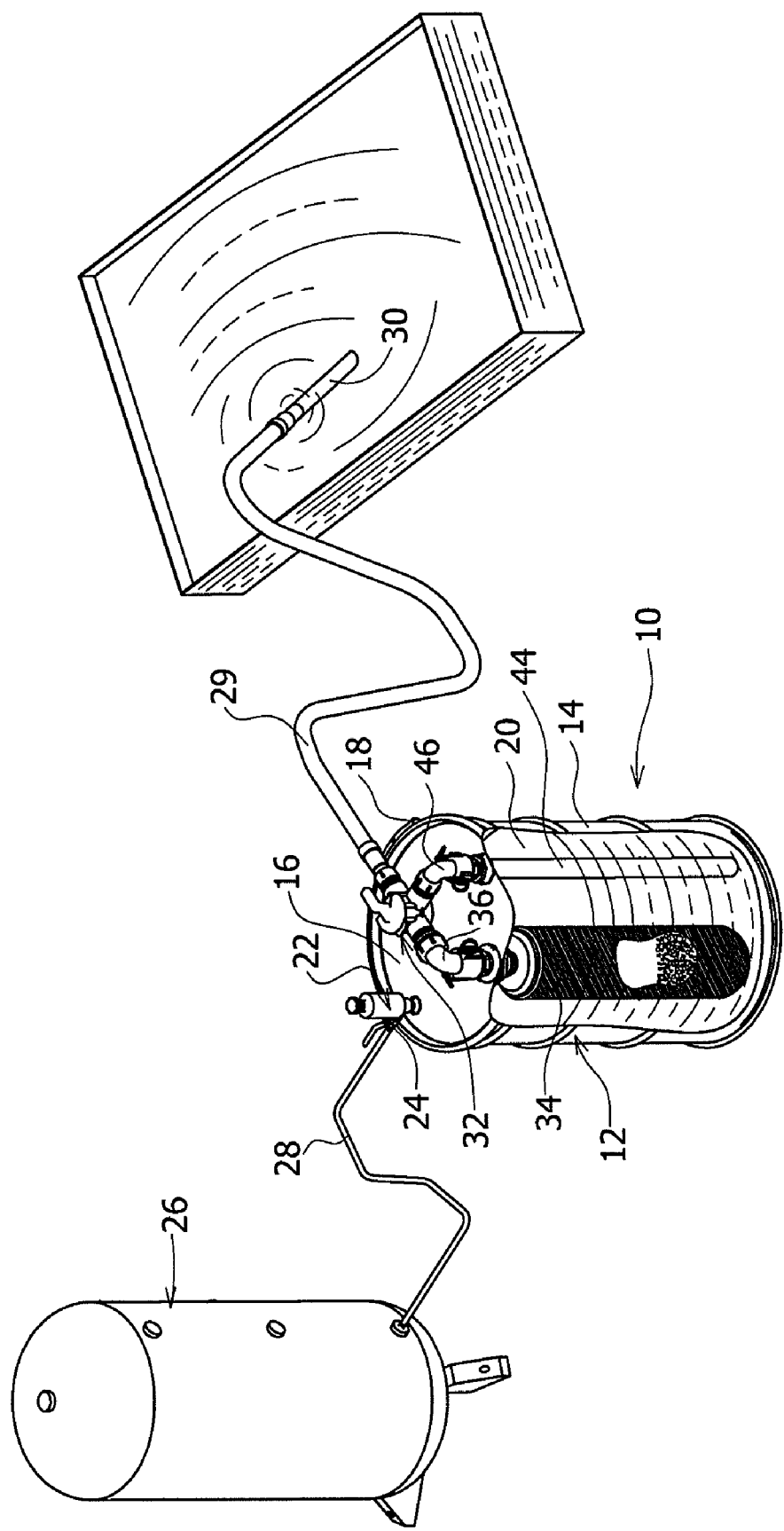
FIG. 1 is a schematic, perspective view of one embodiment of the disclosed liquid vacuuming and filtering device, shown connected to a source of compressed air, and in which the interior of the container is partially broken away to reveal internal components.
Figure 2:
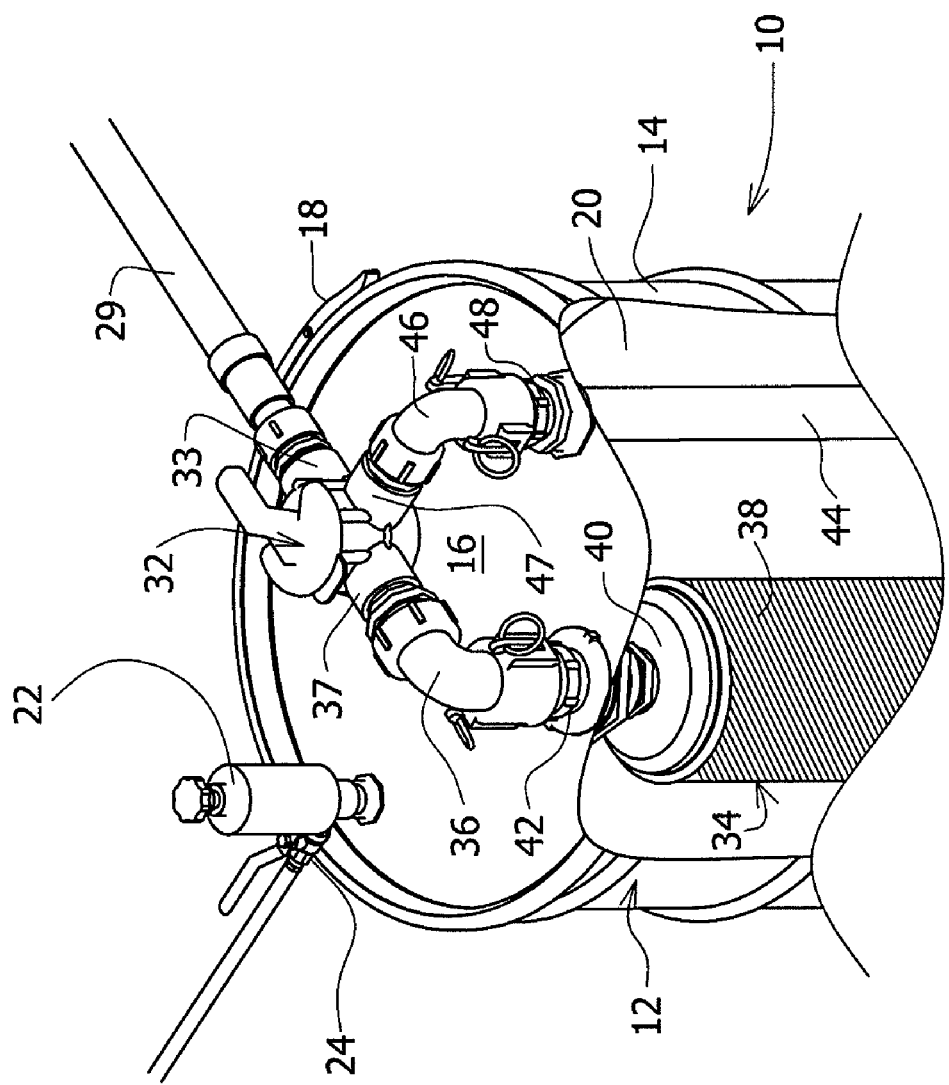
FIG. 2 is a detail of the device of FIG. 1, showing the tank lid and broken away to show the interior of the container.

An embodiment of the disclosed liquid vacuuming and filtering device, generally designated 10, is shown in FIGS. 1 and 2. The device 10 may include a container 12, such as a standard 55-gallon drum. Other containers may be used, such as a 5-gallon or 30-gallon drum or a tank. Plastic containers may be used as well. Any container that is capable of being pressurized positively and negatively without leakage may be used.

The container 12 may include a container body 14 and a removable lid 16. The lid 16 may be secured to the body by a drum latch ring 18 to form a sealed interior 20.

A reversible vacuum pump 22 may be mounted on the lid 16 and may be attached to form a substantially air-tight seal with the lid. The pump 22 may include a shut-off valve 23 (see FIGS. 3 and 4), such as a float valve, that automatically shuts the valve off should the liquid level in the container 12 reach a predetermined maximum level and actuate the valve. This shut-off valve 23 may prevent overfilling the container 12.

The pump 22 also may include a manually operated shut-off valve 24. The shut-off valve 24 may be integrated with the pump, or as shown in FIG. 1, may comprise a separate valve positioned upstream of the pump 22. The pump 22 may be a reversible pneumatic pump, such as an EXAIR Model 6091 Reversible Drum Vac. If the pump 22 is pneumatically operated, the pump may be connected to a source of compressed air, generally designated 26, by a supply line 28, such as a flexible hose or rigid conduit. In such a configuration, the supply line 28 may be connected to the shut-off valve 24, which in turn is connected to pump 22. As shown in FIGS. 1 and 2, the source of compressed air 26 may be a pressurized tank, as shown in FIG. 1 or it may be a compressor or other device for creating pressurized air. The preferred range of delivered compressed air is 80-100 psig. Alternatively, the pump 22 may be an electrically powered pump or blower.

The device 10 may include a flexible hose 29 that may optionally terminate in a tool 30 mounted or attached to its distil end. Tool 30 may be a rigid wand, as shown in FIG. 1, or may be another tool, such as a floor vacuum attachment.

The device 10 also may include a valve, generally designated 32. The valve 32 may be connected to the intake hose 29 at port 33, which may be a barbed fitting. Valve 32 also may be a three-way valve, or a valve having more than three settings.

A filter 34 may be positioned within the interior 20 of the container 12 and connected to the valve 32 by an elbow 36, which may be a female quick release elbow adaptor, which is connected to port 37 of the valve. As shown in FIGS. 1 and 2, the filter 34 may be a porous filter bag, such as a polyester bag. The filter 34 may include a filter bag 38 and an adaptor 40. The adaptor 40 may be connected to a quick-release adaptor 42, such as a male quick release adaptor, that forms a part of the elbow 36. The adaptor 40 may include a bulkhead fitting that forms a substantially air-tight seal with lid 16.

The pore size of the filter bag 38 may vary, depending upon the particular application of the device 10 and the size range of the particulate material to be filtered from the fluid to be collected by the device 10. For example, the bag 38 may have pores in the range of 1μ up to 125μ in size. Other forms of filter 34 may be employed, such as a mesh filter made of metal. Other shapes of filter 34 may be employed as well.

Also as shown in FIGS. 1 and 2, the device may include a discharge pipe 44, such as a standpipe that may comprise a section of PVC pipe. Alternatively, the discharge pipe 44 may be made of corrosion-resistant metal, metal coated or treated to be corrosion resistant, or a plastic other than PVC, such as nylon. The standpipe 44 may be connected to the valve 32 by a quick-release elbow adaptor 46, such as a female quick release elbow adaptor, which may be attached to port 47 of the valve. Elbow adaptor may include a quick-release adaptor 48, such as a male quick release adaptor. Adaptor 48 may form a substantially air-tight seal with lid 16. Alternatively, the discharge pipe 44 may pass through the body 14 of container 12 or through the bottom of the container and extend to valve 32.

Figure 3:
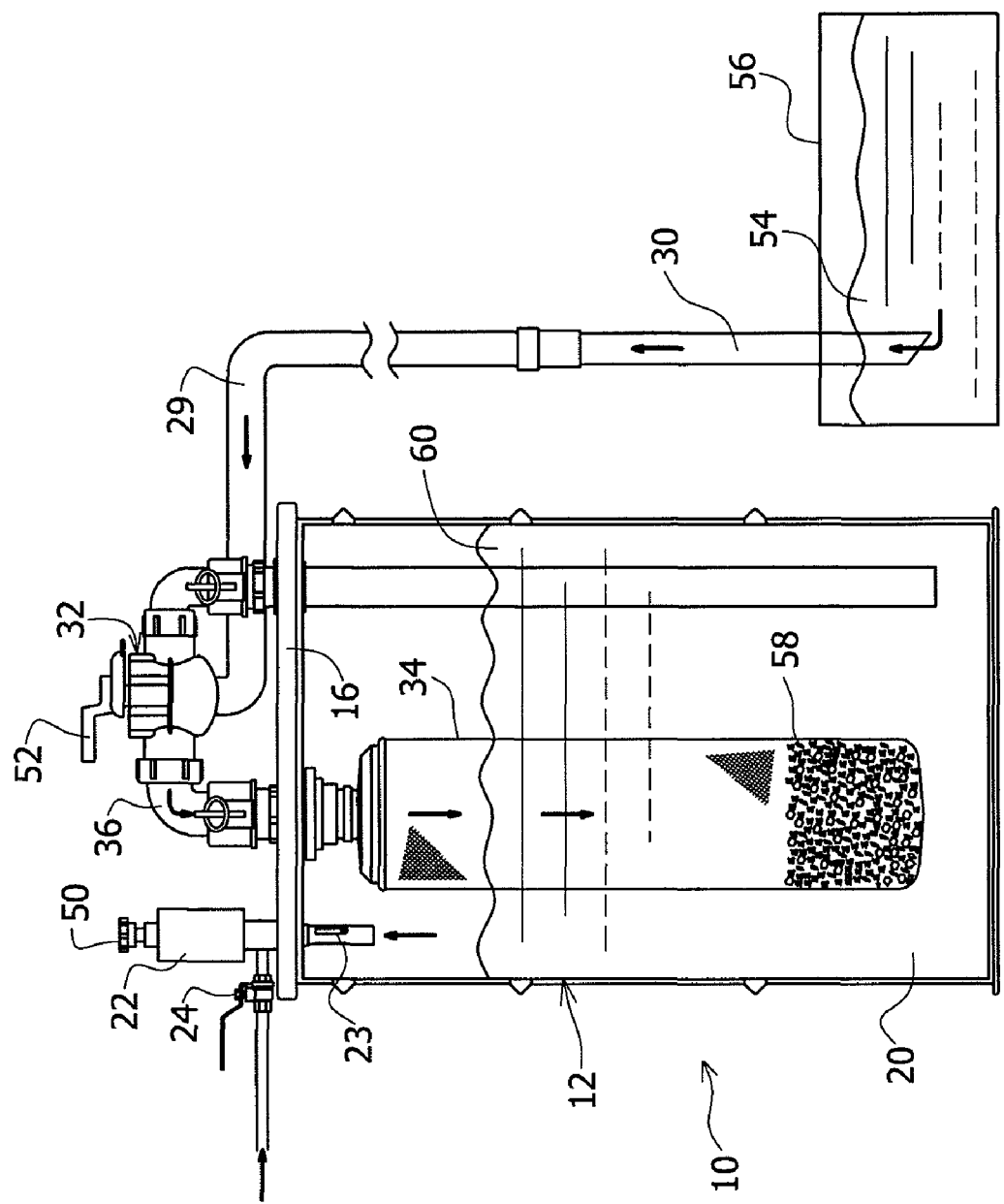
FIG. 3 is a schematic, side elevation in section of the device of FIG. 1, shown adjusted to a filling configuration.
Figure 4:
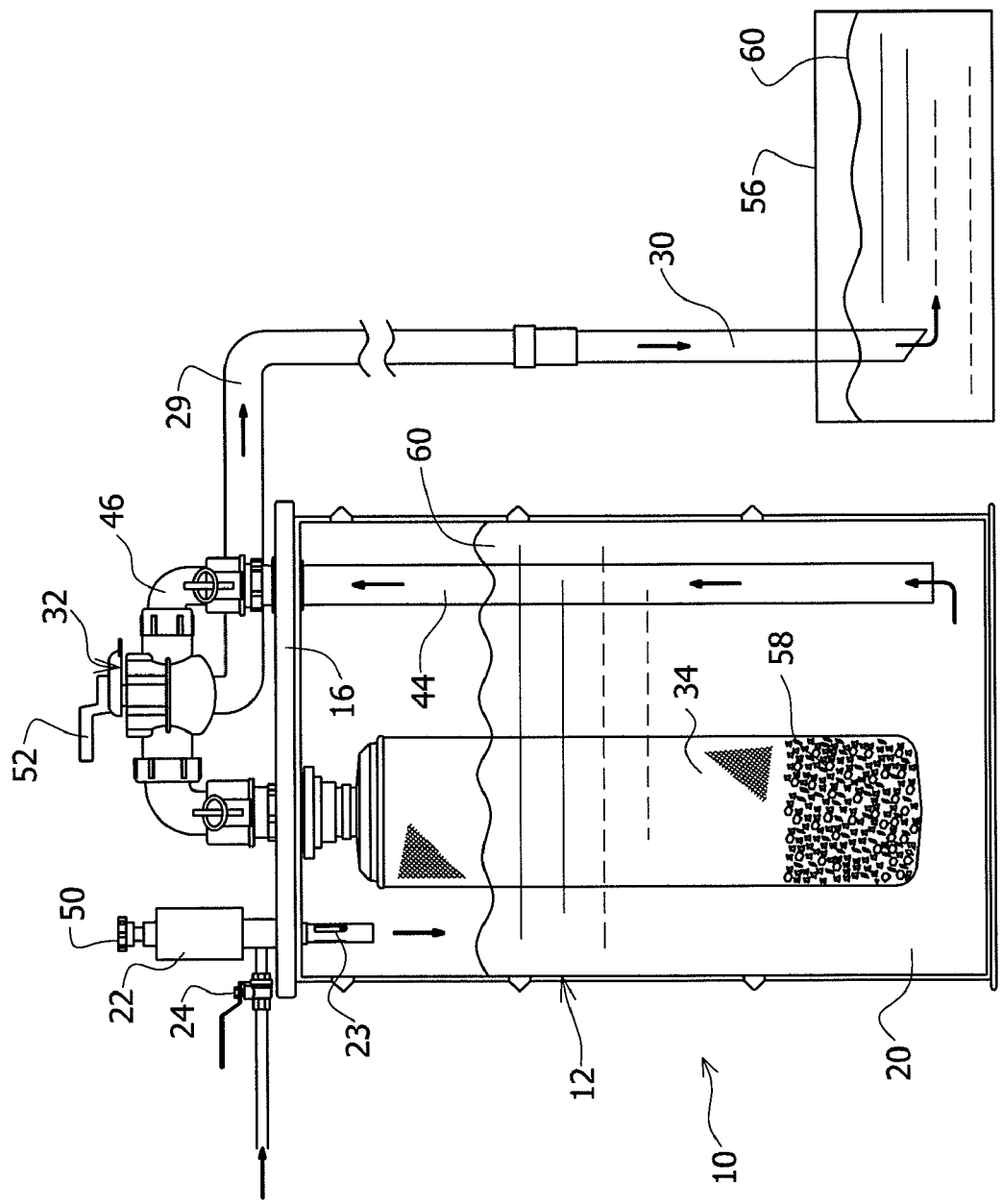
FIG. 4 is a schematic, side elevation in section of the device of FIG. 1, shown adjusted to a discharge configuration.

The method of operation of the device 10 is shown in FIGS. 3 and 4. To place the device 10 in a filling configuration, as shown in FIG. 3, the shut-off valve 24 is closed, which shuts off the flow of pressurized air to inactivate the reversible vacuum pump 22. The knob 50 on the pump 22 is turned to adjust the pump to a configuration in which air is evacuated from the interior 20 of the container 12. The handle 52 on two-way valve 32 is adjusted to connect the hose 29 with the filter bag 34 within the interior 20 of the container 12. Thus, a continuous intake channel is formed that extends through the tool 30, hose 29, ports 33 and 37 of valve 32, elbow 36 and quick-release adaptor 42 and filter 34 in the interior 20 of container 12. The tool 30, such as a wand shown in FIG. 3, is placed within the contaminated fluid 54 in a vessel 56, such as the sump shown in FIG. 3.

The shut-off valve 24 is opened and the reversible pump 22 evacuates air from the interior 20 of the container 12. This creates a below-ambient pressure condition within the container 12 so that fluid 54 is drawn through the wand 30, hose 29, valve 32, elbow 36 and into the filter bag 34. The particulate material 58 contained in the fluid 54 is collected in the filter bag 34. The interior 20 of the container 12 then fills with filtered fluid 60. It is preferable for an operator to move the wand around in the vessel 56 to make sure that all the contaminants are stirred up and drawn through the hose 29 with the fluid 54 and into the container 12.

Once the vessel 56 is emptied, the shut-off valve 24 may be closed to stop the pump 22 and prevent overfilling or to prevent fluid or air from continuing to be drawn from the interior 20 of the container 12. Alternatively, the device may be allowed to operate until the shut-off valve 23 is activated by the rising level of fluid 60 in the container 12, which shuts off pump 22. The container 12 is now filled with fluid 60 from which the particulate contaminants 58 have been removed.

As shown in FIG. 4, to place the device 10 in a discharging configuration, shut off valve 24 preferably is in the closed position. The knob 50 then may turned on the reversible vacuum pump 22 so that the pump is adjusted to pressurize the interior 20 of the container 12. The handle 52 of the valve 32 is adjusted to connect the standpipe 44 within the container 12 with the hose 29. A continuous fluid discharge channel is thus formed that extends through standpipe 44, elbow 46 and quick release 48, ports 47 and 33 of valve 32, and flexible hose 29 and tool 30. The wand 30 is placed into the vessel 56 where clean, filtered fluid 60 from the interior 20 of the container 12 is desired. The shut-off valve 24 is opened, allowing pressurized air from source 26 (see FIG. 1) to activate the reversible vacuum pump 22, which begins to pressurize the interior 20 of the container 12. This above-ambient pressure condition in the interior 20 forces the filtered fluid 60 within the interior 20 to flow upwardly through the standpipe 44, through elbow 46, valve 32, and through the hose 29 and wand 30 back into the vessel 56, if desired. The vessel 56 then is refilled with the clean, filtered fluid 60.

The standpipe 44 preferably is oriented substantially vertically within the container 12 and sized to open near the bottom of the interior 20 so that the container may be substantially completely emptied of filtered fluid 60 during fluid discharge operation. When the fluid 60 is discharged from the container 12, the shut-off valve 24 may be adjusted to shut off the flow of compressed air from the source 26 (FIG. 1) to the pump 22, which stops the pump and the discharge of fluid 60 from the container 12.

At this time, the latch ring 18 (see FIGS. 1 and 2) may be disengaged, which allows an operator to remove the lid 16 from the body 14 of the container 12. The filter bag 34 may be removed from the adaptor 40 and the collected particulate material 58 emptied from the bag. In the alternative, the bag 34 may be discarded and replaced with a fresh bag.

In conclusion, the device 10 provides a means of vacuuming, filtering and returning filtered fluid to a source, such as a sump, without the necessity of disconnecting and reconnecting hoses. The device preferably is portable and may be mounted on a wheeled dolly (not shown), or may be provided in a stationary or wall-mounted form.

While the form of apparatus herein described and illustrated may constitute a preferred embodiment of the disclosed device, it is to be understood that this device is not limited to this precise form of apparatus, and that changes may be made therein without departing from the scope of the invention.

What is claimed is:

1. A liquid vacuuming and filtering device comprising:
   a container having an interior substantially sealed from its ambient environment, said container including a removable lid capable of forming a substantially air-tight seal with a remainder of said container;
   a pneumatically powered vacuum pump in fluid communication with said container interior, said vacuum pump including adjustment means for changing from a filling configuration, wherein said vacuum pump evacuates said interior to a pressure below ambient, to a discharge configuration, wherein said vacuum pump pressurizes said interior to a pressure above ambient;
   a hose;
   a filter bag positioned within said container interior and having an internal cavity sealed from said interior, wherein particulates contained in incoming fluid are collected in said internal cavity;
   a discharge pipe positioned within said container interior; and
   a valve connected to said hose, said filter bag and said discharge pipe and being adjustable alternatively to interconnect said hose to said filter bag and to interconnect said hose to said discharge pipe, said valve being adjustable to a filling configuration, wherein said hose is in fluid communication with said filter, and to a discharge configuration, wherein said hose is in fluid communication with said discharge pipe; said device being oriented to a vacuuming and filtering configuration by placing said vacuum pump and said valve in said respective filling configurations, whereby below ambient pressure in said interior causes fluid in contact with said hose to be drawn through said hose, said valve and said filter, such that particulates in said fluid are collected in said filter bag and said fluid collects in said container interior, and to a fluid discharge configuration by placing said vacuum pump and said valve in said respective discharge configurations, whereby above ambient pressure in said interior causes filtered fluid contained in said interior to be forced through said discharge pipe, said valve and out said hose.

2. The device of claim 1 further comprising a shut off valve positioned in a line between said pneumatically powered vacuum pump and a source of compressed air.

3. The device of claim 1 wherein said filter bag is removable and reusable.

4. The device of claim 1 wherein said filter bag is made of polyester.

5. The device of claim 1 wherein said container is a drum.

6. The device of claim 5 wherein said drum is a 55-gallon drum.

7. The device of claim 1 wherein said pump, said valve, said filter bag and said discharge pipe are mounted on said lid.

8. The device of claim 1 wherein said container further includes a drum latch ring for securing said lid to said remainder of said container.

9. The device of claim 1 wherein said valve is a two-way valve.

10. The device of claim 1 wherein said valve is a three-way valve.

11. The device of claim 1 wherein said discharge pipe is a standpipe.

12. The device of claim 11 wherein said standpipe is oriented substantially vertically within said container interior and opens near a bottom of said container interior.

* * * * *